United States Patent
Middleton (10) Patent No.: US 12,104,337 B2
(45) Date of Patent: Oct. 1, 2024

(54) SURFACE ASSEMBLY

(71) Applicant: NUCLEAR ENERGY COMPONENTS LIMITED, Derbyshire (GB)

(72) Inventor: Vincent Middleton, Ashbourne (GB)

(73) Assignee: NUCLEAR ENERGY COMPONENTS LIMITED, Derbyshire (GB)

( * ) Notice: Subject to any disclaimer, the term of this patent is extended or adjusted under 35 U.S.C. 154(b) by 254 days.

(21) Appl. No.: 17/421,461

(22) PCT Filed: Dec. 30, 2019

(86) PCT No.: PCT/GB2019/053707
§ 371 (c)(1),
(2) Date: Jul. 8, 2021

(87) PCT Pub. No.: WO2020/152434
PCT Pub. Date: Jul. 30, 2020

(65) Prior Publication Data
US 2022/0064880 A1 Mar. 3, 2022

(30) Foreign Application Priority Data
Jan. 22, 2019 (GB) ..................... 1900888

(51) Int. Cl.
*B64F 1/12* (2006.01)
*E01F 3/00* (2006.01)

(52) U.S. Cl.
CPC ............... *E01F 3/00* (2013.01); *B64F 1/125* (2013.01)

(58) Field of Classification Search
CPC ........... E01F 3/00; B64F 1/125; B64F 1/007; B64F 1/12; E01C 9/008; E01C 9/083;
(Continued)

(56) References Cited

U.S. PATENT DOCUMENTS 3,877,664 A * 4/1975 Mesnet .................... E01F 3/00
244/115
4,420,131 A * 12/1983 Middleton .............. B64F 1/125
244/116
4,836,472 A * 6/1989 Sutter ....................... E01F 3/00
244/114 R
(Continued)

FOREIGN PATENT DOCUMENTS

CN 108016605 A 5/2018
CN 108313319 7/2018
(Continued)

OTHER PUBLICATIONS

Great Britain Search Report dated Jul. 10, 2019 issued in Great Britain Patent Application 1900888.7, 4 pp.
(Continued)

*Primary Examiner* — Medhat Badawi
*Assistant Examiner* — Vicente Rodriguez
(74) *Attorney, Agent, or Firm* — NIXON & VANDERHYE P.C.

(57) ABSTRACT

A surface assembly and related method of constructing a surface assembly are used as part of a landing platform. The surface assembly includes a modular structure having an upper surface with a plurality of discrete elements. Each discrete element has a body of metal material defining at least one anchor aperture for receiving a hook or like anchor device for anchoring a helicopter or other powered light aircraft to the surface assembly. The surface assembly is configured to define an array of the plurality of discrete elements in which at least two of the anchor apertures are provided side-by-side. The body of each discrete element has a periphery, and each anchor aperture of the array is inboard of the periphery of a respective body of a discrete element in the array.

15 Claims, 5 Drawing Sheets

(58) Field of Classification Search
CPC ..... E01C 5/20; B64C 2025/325; B64C 25/32; B64U 70/30
See application file for complete search history.

(56) References Cited

U.S. PATENT DOCUMENTS

| | | | |
|---|---|---|---|
| 4,878,634 A * | 11/1989 | Pacault | B63B 25/28 114/261 |
| 5,288,165 A * | 2/1994 | Douwes Dekker | E01C 9/08 404/35 |
| 5,577,687 A * | 11/1996 | Downing | B64F 1/007 244/114 R |
| 2015/0151852 A1 | 6/2015 | Cardell et al. | |
| 2018/0086482 A1* | 3/2018 | Bistuer | B64F 1/125 |
| 2018/0178665 A1 | 6/2018 | Chen et al. | |

FOREIGN PATENT DOCUMENTS

| | | | |
|---|---|---|---|
| EP | 0 052 966 | 6/1982 | |
| FR | 1253269 | 2/1961 | |
| FR | 2 709 281 | 3/1995 | |
| GB | 1 401 387 | 7/1975 | |
| GB | 2 414 973 | 12/2005 | |
| GB | 2414973 A * | 12/2005 | B64F 1/007 |

OTHER PUBLICATIONS

International Search Report dated Apr. 14, 2020 issued in PCT International Patent Application No. PCT/GB2019/053707, 2 pp.
European Examination Report dated Aug. 31, 2023 issued in European Patent Application No. 19832996.3, 6 pp.

* cited by examiner

SURFACE ASSEMBLY

This application is the U.S. national phase of International Application No. PCT/GB2019/053707 filed Dec. 30, 2019 which designated the U.S. and claims priority to Great Britain Patent Application No. 1900888.7 filed Jan. 22, 2019, the entire contents of each of which are hereby incorporated by reference.

FIELD

The present invention relates to a surface assembly, more particularly, but not exclusively, to a surface assembly for use as a landing grid for helicopters and/or other powered light aircraft. The invention also relates to components for a surface assembly, and method for producing the same.

BACKGROUND

A helipad is a landing area for receiving a helicopter and/or other powered light aircraft. It is known to designate areas of pavement or other surface as a dedicated helipad (e.g. using paint or other visual markers). It is also known to use a fabricated landing grid as a surface to act as a helipad, by means of which a helicopter and/or other powered light aircraft can be tethered during or after landing.

Conventionally, fabricated landing grids are produced from a single piece of large surface area material (typically from steel), which presents a number of problems.

Firstly, the landing grid needs to be machined to include multiple anchor points, for receiving a hook or like anchor device for tethering a helicopter or other powered light aircraft to the landing grid. This can be extremely difficult to automate, particularly when handling a piece of steel with a large surface area e.g. having a diameter or width several metres in length. As a result, manufacture of conventional landing grids is very costly.

Fabrication of landing grids of this type also relies on specialist steel mills, which often have lead times of two years or more. Therefore, it is only possible to source landing grids at short notice if they are of a standard size and shape, which may be stocked in a warehouse. In addition, the large surface area and heavy weight makes it impractical to store a large number of landing grids in a warehouse. Therefore, in many cases the only option to source a landing grid may be via the costly and lengthy custom fabrication process. The large surface area also presents challenges for distribution and installation.

Furthermore, since the landing grid is fabricated from a single piece of steel, it is impossible to repair or reconfigure the landing grid without further custom steel mill processes (with all of the associated disadvantages highlighted above). For example, in the case of damage to the grid or a change in size or shape requirements.

The present invention seeks to obviate or mitigate the problems of conventional fabricated landing grids.

SUMMARY

According to a first aspect of the invention, a surface assembly is provided, the surface assembly including a modular structure having an upper surface including a plurality of discrete elements, each discrete element comprising a body defining at least one anchor aperture for receiving a hook or like anchor device, and wherein the surface assembly is configured to define an array of said discrete elements in which at least two of said anchor apertures are provided side-by-side.

Advantageously, this surface assembly does not rely on specialist plate manufacture from steel mills. Modular parts can be stocked, packed and shipped in a box as opposed to large structures. In this way, a surface assembly of any size can be constructed at short notice. This is in contrast to steel mill lead times which are often 2 years or more. Further, the surface assembly of this type can be dismantled, repaired or reconfigured in case of damage to the surface assembly or a change in the surface assembly size or shape requirements.

Moreover, having at least one pair of anchor apertures provides more than one option for receiving the hook or like anchor device, which reduces the required positional control precision of the hook or like anchor device.

In exemplary embodiments, the body of each discrete element has a periphery, wherein each anchor aperture of the array is inboard of the periphery of a respective body of a discrete element in the array.

By each anchor aperture of the array being inboard of the periphery of a respective body of a discrete element in the array (e.g. as opposed to having one or more anchor apertures defined between the bodies of two or more discrete elements) it is possible to ensure that all of the anchor apertures of the surface assembly are a uniform size and shape (within manufacturing tolerances). In contrast, if one or more anchor apertures are defined between the bodies of two or more discrete elements, the size and/or shape of these anchor apertures will vary depending on the alignment of the discrete elements, which could result in a small or mis-shapen anchor aperture which is not configured correctly for receiving a hook or like anchor. This is of particular importance when the surface assembly is used as part of a landing platform for anchoring a helicopter or other light powered aircraft, where it is desirable that a hook can be reliably engaged with any of the anchor apertures of the surface assembly.

In exemplary embodiments, the surface assembly is configured for use as part of a landing platform, e.g. for anchoring a helicopter or other powered light aircraft.

In exemplary embodiments, the sum of the areas defined by the at least two anchor apertures is in the range of 30% to 70% of the total area of the surface assembly in plan view.

Having the sum of the areas defined by the at least two anchor apertures in this range has been found to be ideal for receiving a hook or like anchor device for anchoring a helicopter or other powered light aircraft to the surface assembly. More specifically, such a range provides a good trade-off between providing sufficient area for receiving a hook or like anchor and providing sufficient strength in the surface assembly.

If the area defined by the anchor apertures was larger than 70% of the total area of the surface assembly, the portions of the discrete element bodies located between the anchor apertures could be too weak to support the forces exerted by the hook or like anchor and any object (e.g. helicopter or other light powered aircraft) attached thereto. This could result in damage to one or more discrete element bodies and the hook or like anchor being disengaged form the surface assembly unintentionally. This would be a particular issue when anchoring a helicopter or other light powered aircraft to the surface assembly, since unintentional disengagement from the surface assembly could lead to injury to people located on or around the helicopter or other light powered aircraft, and/or damage to the helicopter or other light powered aircraft.

If the area defined by the anchor apertures was less than 30% of the total area of the surface assembly, it would be difficult to engage a hook or like anchor with the surface assembly, since the "target area" for receiving the hook or like anchor would be too small. This could result in it being very difficult to engage a hook or like anchor (e.g. for anchoring a helicopter or other light powered aircraft) with the surface assembly in a single attempt.

In exemplary embodiments, each discrete element comprises a periphery configured for tessellation with the periphery of at least one other discrete element of the same shape and configuration, e.g. so that no substantial gaps or overlapping regions are formed between the bodies of adjacent discrete elements in the array.

Advantageously, such a configuration ensures that the discrete elements fit together to form the surface assembly.

In exemplary embodiments, the periphery of each discrete element is defined by a polygon in plan view.

Advantageously, having such a periphery allows the discrete elements to be manufactured as regular shapes.

In exemplary embodiments, said polygon is a regular 3, 4 or 6 sided polygon.

In exemplary embodiments, said polygon is a regular hexagon.

In exemplary embodiments, the periphery comprises a plurality of facets, wherein each facet is configured to be arranged against a complementary facet of at least one other discrete element of the same shape and configuration.

In exemplary embodiments, each discrete element comprises an inner surface, wherein said anchor aperture defines the inner surface, wherein a significant proportion of the inner surface has a curved cross section, wherein the curved cross section extends from a first diameter at an upper surface of the discrete element to a second diameter at a depth within the discrete element, and wherein the first diameter is larger than the second diameter.

Advantageously, such a curved inner surface helps the hook or like anchor device to engage with the surface assembly, since the curved portion acts like a funnel to guide the hook or like anchor device through the anchor aperture.

In exemplary embodiments, the assembly includes a link member provided to collocate two or more discrete elements in the array.

In this way, the link member is used to collocate the two or more discrete elements in close proximity.

In exemplary embodiments, the link member is configured to interlink two or more discrete elements in the array.

By interlinking two or more discrete elements in the array, said discrete elements can be positioned and orientated as desired, e.g. so that said discrete elements are tessellated.

In exemplary embodiments, the link member is provided between two or more discrete elements in the array.

By locating the link member between said discrete elements, the link member does not obstruct a hook or like anchor engaging said discrete elements from above/below the discrete elements, or obstruct a stanchion or other component of the surface assembly. In other words, locating the link member between said discrete elements provides a means of collocating and/or interlinking said discrete elements, without altering the external geometry of the array.

In exemplary embodiments, each discrete element comprises a periphery and a peripheral groove or recess extending around said periphery, wherein the peripheral groove or recess is configured for receiving a portion of the link member.

Such peripheral grooves or recesses for receiving a portion of the link member provide a means for locating the link member between two or more discrete elements in the array.

In exemplary embodiments, the link member and the peripheral groove or recess are configured to have complementary size and shape, such that the link member can be disposed between two or more discrete elements of the same size and shape without preventing tessellation of the peripheries above the peripheral grooves or recesses.

Advantageously, such a link member and peripheral groove/recess arrangement allows the link member to be disposed between two adjacent discrete members, whilst ensuring no substantial gaps in the upper surface of the assembly.

In exemplary embodiments, the assembly includes a locking member provided for locking together the link member and collocated discrete elements in the array.

Advantageously, such a locking member ensures the modular components are secured together to create a rigid and fixed surface assembly.

In exemplary embodiments, the link member and two or more collocated discrete elements in the array are locked together by the locking member.

In exemplary embodiments, the locking member comprises one or more formations configured to contact the link member and two or more collocated discrete elements in the array.

In exemplary embodiments, the link member comprises a first engagement formation and the locking member comprises a second engagement formation configured to engage the first engagement formation.

Such first and second engagement formations provide a means of fastening or locking the locking member to the link member.

In exemplary embodiments, the locking member comprises a third engagement formation configured to contact two or more collocated discrete elements in the array.

By having a third engagement formation configured to contact two or more collocated discrete elements in the array, said collocated discrete elements are can be fastened or locked together (e.g. via complementary formations on the discrete elements, or via a frictional force exerted on the discrete elements by the third engagement formation).

In exemplary embodiments, each discrete element comprises a lower surface and a distributed plurality of access recesses below the peripheral groove or recess, each access recess being configured for receiving an end of the locking member, wherein said access recesses extend from the lower surface to the peripheral groove or recess.

Such access recesses allow the upper surface of the discrete elements to be tessellated, whilst providing a gap in the lower surface for receiving the locking member. Advantageously, such access recesses allow the locking member to secure the discrete elements and link member together to form a sturdy and fixed assembly.

In exemplary embodiments, the locking member comprises an end and a shoulder, wherein the lower surface of the discrete elements comprises a portion surrounding said access recesses, wherein the end of the locking member extends through said access recesses in the discrete elements to engage the link member, wherein the shoulder of the locking member engages the portion of the lower surface surrounding said access recesses.

Advantageously, such an arrangement allows locking of both the link member and adjacent discrete elements with a single locking member.

In exemplary embodiments, the end of the locking member comprises a thread and the link member comprises a complementary thread within the link member, wherein the locking member engages the link member via relative rotation of the threads.

In exemplary embodiments, said array is spaced from a floor surface in use, via a plurality of stanchions.

Advantageously, spacing the array from the floor surface in use provides a void into which a hook or like anchor can extend.

In exemplary embodiments, the locking member comprises a stanchion, for spacing the array from a floor surface in use.

Advantageously, the stanchion provides dual function of securing the discrete elements and link member together, whilst separating the array from the floor surface to create a void into which a hook or like anchor can extend.

In exemplary, the assembly includes a fastening member provided for fastening together the link member and associated collocated discrete elements in the array.

In exemplary embodiments, the link member and two or more collocated discrete elements in the array are fastened together by the fastening member.

In exemplary embodiments, the fastening member comprises one or more formations configured to contact the link member and two or more collocated discrete elements in the array.

In exemplary embodiments, the link member comprises a first engagement formation and the fastening member comprises a second engagement formation configured to engage the first engagement formation.

Such first and second engagement formations provide a means of fastening the fastening member to the link member.

In exemplary embodiments, the fastening member comprises a third engagement formation configured to contact two or more collocated discrete elements in the array.

By having a third engagement formation configured to contact two or more collocated discrete elements in the array, said collocated discrete elements are can be fastened together (e.g. via complementary formations on the discrete elements, or via a frictional force exerted on the discrete elements by the third engagement formation).

In exemplary embodiments, each discrete element comprises a lower surface and a distributed plurality of access recesses below the peripheral groove or recess, each access recess being configured for receiving an end of the fastening member, and wherein said access recesses extend from the lower surface to the peripheral groove or recess.

In exemplary embodiments, the fastening member comprises an end and a shoulder, wherein the lower surface of the discrete elements comprises a portion surrounding said access recesses, wherein the end of the fastening member extends through said access recesses in the discrete elements to engage the link member, wherein the shoulder of the fastening member engages the portion of the lower surface surrounding said access recesses.

Advantageously, such an arrangement allows fastening of both the link member and adjacent discrete elements with a single fastening member.

In exemplary embodiments, the end of the fastening member comprises a thread and the link member comprises a complementary thread within the link member, wherein the fastening member engages the link member via relative rotation of the threads. In exemplary embodiments, the fastening member comprises a stanchion, for spacing the array from a floor surface in use.

Advantageously, the stanchion provides dual function of securing the discrete elements and link member together, whilst separating the array from the floor surface to create a void into which a hook or like anchor can extend.

In exemplary embodiments, the surface assembly defines a landing grid in plan view, wherein said array comprises a tessellation of said discrete elements.

Advantageously, providing the array as a tessellation of discrete elements ensures a solid landing grid, since there are no substantial gaps between the peripheries of the discrete elements.

In exemplary embodiments, the diameter of each anchor aperture is in the range of 1 cm and 25 cm.

In exemplary embodiments, the diameter of each anchor aperture is in the range of 2 cm and 10 cm.

In exemplary embodiments, the diameter of each anchor aperture is in the range of 4 cm and 6 cm.

In exemplary embodiments, each anchor aperture has a centre, wherein the distance from the centre to a centre of each adjacent anchor aperture is in the range of 1.3 cm and 32.5 cm.

In exemplary embodiments, each anchor aperture has a centre, wherein the distance from the centre to a centre of each adjacent anchor aperture is in the range of 2.6 cm and 13 cm.

In exemplary embodiments, each anchor aperture has a centre, wherein the distance from the centre to a centre of each adjacent anchor aperture is in the range of 5.2 cm and 7.8 cm.

In this way, the anchor apertures are suitably sized for receiving hook or like anchor devices of known construction and of conforming to landing grid standards.

In exemplary embodiments, the body of each discrete element is of metal material.

The bodies of the discrete elements being of metal material makes them suitable for receiving a hook or like anchor device of a helicopter or other light powered aircraft, since metal is strong enough to withstand large anchoring forces without risking damage to the bodies of the discrete elements in the array.

In exemplary embodiments, each discrete element, link member, locking member, or fastening member is of stainless steel.

In exemplary embodiments, each discrete element, link member, locking member, or fastening member is of precipitation hardened stainless steel.

In exemplary embodiments, each discrete element, link member, locking member or fastening member is of precipitation hardened stainless steel with high tensile strength.

In exemplary embodiments, each discrete element, link member, locking member, or fastening member is of maraging steels.

Advantageously, such materials ensure that the surface assembly is strong enough for use in securing a helicopter or other powered light aircraft, and for satisfying any relevant standards or safety certification requirements.

In exemplary embodiments, each discrete element, link member, locking member or fastening member is a machined, forged or cast component.

Advantageously, these components being machined, forged or cast components allows an appropriate manufacturing technique to be chosen depending on the type of raw materials used. For example, machining from offcut blocks of metal, casting from molten scrap metal etc.

In exemplary embodiments, each discrete element defines a single anchor aperture.

Advantageously, providing discrete elements with a single anchor aperture is a simple configuration which is easier to manufacture via a machining, forging or casting process than a multi-aperture component.

Moreover, each discrete element defining a single anchor aperture provides greater flexibility over the size and shape of surface assemblies that can be assembled.

In exemplary embodiments, the locking member comprises a shoulder and each discrete element comprises a plurality of locking grooves in the lower surface, wherein each locking groove is configured to receive a portion of the shoulder of the locking member, and wherein said locking grooves extend concentrically around the plurality of access recesses.

Advantageously, these locking grooves provide a better surface for engagement with the complementary shoulder of the locking member. In other words, the shoulder of the locking member acts as a key to be located within said locking grooves to fix the locking member to the lower surface of the discrete elements.

According to a second aspect of the invention, a discrete element for use in a surface assembly is provided, the discrete element comprising a body defining at least one anchor aperture for receiving a hook or like anchor device.

In exemplary embodiments, the body is of metal material.

In exemplary embodiments, the discrete element further comprises a periphery, wherein the periphery is configured for tessellation with a periphery of at least one other discrete element of the same shape and configuration.

In exemplary embodiments, the discrete element further comprises a peripheral groove or recess extending around said periphery, wherein the peripheral groove or recess is configured for receiving a portion of the link member.

In exemplary embodiments, the discrete element further comprises an upper and a lower surface; and a plurality of access recesses below the peripheral groove or recess, each access recess being configured for receiving an end of a locking member, wherein said access recesses extend from the lower surface to the peripheral groove or recess.

Advantageously, multiple discrete elements of this type can be tessellated to form an array. In other words, the discrete elements fit together with no substantial gaps or overlapping between them. Moreover, peripheral grooves/recesses and access recesses in the discrete elements allow link and locking members of complementary configuration to be used to secure the surface array.

According to a further aspect of the invention, a method of constructing a surface assembly is provided, including: providing a plurality of discrete elements according to the second aspect of the invention; providing a link member of complementary shape and configuration to the peripheral groove or recess in the periphery of each discrete element; disposing the link member between adjacent discrete elements to collocate the discrete elements; tessellating said plurality of discrete elements to form an array; providing a locking member, of complementary shape and configuration to the access recesses in the periphery; engaging the locking member with said discrete elements and link member to lock them together; additionally or alternatively separating the array from a floor surface via a plurality of stanchions.

Advantageously, this method provides flexibility to construct surface assemblies of any size or shape via changing the number or distribution of modular elements. This method of modular construction also allows for simple reconfiguration of the surface assembly, replacement of damaged elements and management of obsolescence via upgrading elements. In addition, small modular components can be more easily manufactured, stored and distributed than large surface assemblies.

According to a further aspect of the invention, there is proved a landing zone for a helicopter or other powered light aircraft, said landing zone incorporating a surface assembly in accordance with the first aspect of the invention and/or a discrete element in accordance with the second aspect of the invention. In exemplary embodiments, the surface assembly defines the whole or a significant proportion of the surface area of said landing zone. In other embodiments, the surface assembly forms part of the periphery or one or more dedicated areas within the overall surface area of said landing zone, e.g. so as to define discrete anchor regions within the overall surface area of the landing zone.

BRIEF DESCRIPTION OF THE DRAWINGS

Embodiments are now briefly described, by way of example only, with reference to the accompanying drawings, in which.

DETAILED DESCRIPTION

Embodiments are now described in detail, by way of example only, with reference to the accompanying drawings.

Figure 1:
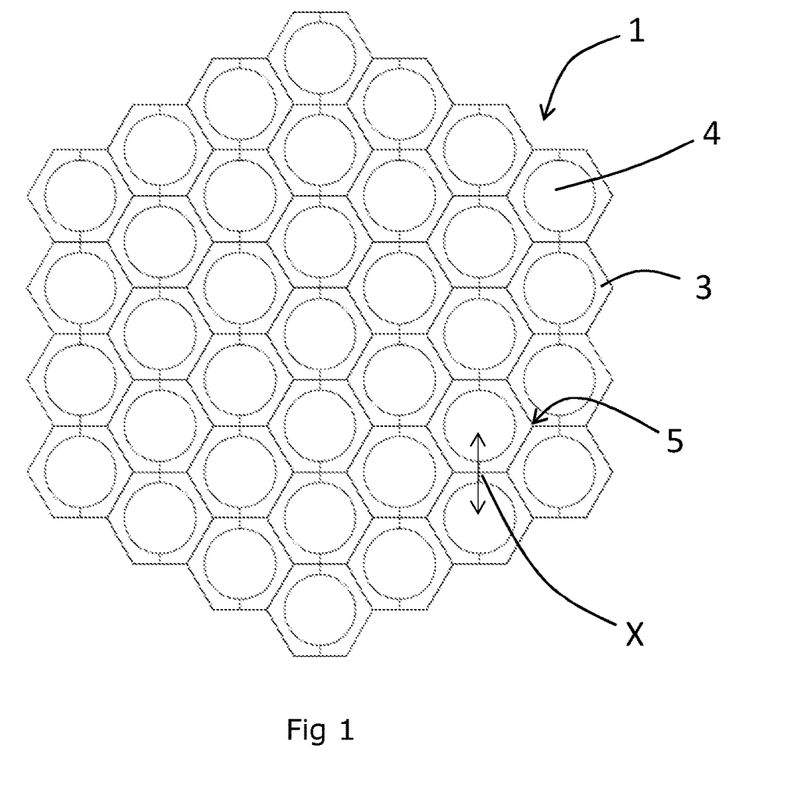
FIG. 1 is a plan view of a surface assembly according to an embodiment.
Figure 2:
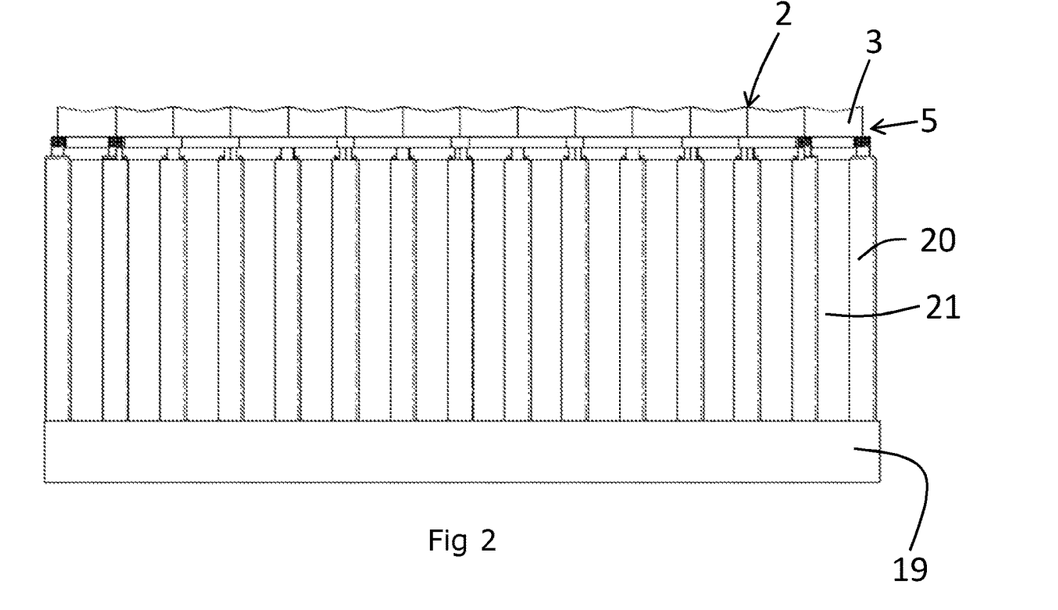
FIG. 2 is a side view of the surface assembly of FIG. 1.

With reference to FIGS. 1 and 2, a surface assembly for use as part of a landing platform is depicted at 1. The surface assembly 1 takes the form of a modular structure having an upper surface 2, including a plurality of discrete elements 3, each discrete element 3 defining at least one anchor aperture 4 for receiving a hook or like anchor device (not depicted). The surface assembly 1 is configured to define an array 5 of said discrete elements 3, in which at least two anchor apertures 4 are provided side-by-side. Each of the anchor apertures 4 of the surface assembly 1 is defined by the body of a single discrete element 3.

Such a surface assembly 1 may be used for tethering a helicopter or other powered light aircraft, via engagement of a hook or like anchor device on said helicopter or other powered light aircraft with at least one anchor aperture 4 in the surface assembly 1. A surface assembly 1, having at least two anchor apertures 4 provides more than one option for receiving the hook or like anchor device, which reduces the required precision of the positional control of the helicopter or other powered light aircraft.

In the illustrated embodiment, the sum of the areas defined by the anchor apertures 4 is approximately 50% of the total area of the surface assembly 1 in plan view. In alternative embodiments, the sum of the areas defined by the anchor apertures 4 could be anything in the range of 30% to 70% of the total area of the surface assembly 1.

Having the sum of the areas defined by the anchor apertures 4 in this range provides a good trade-off between providing sufficient area for receiving a hook or like anchor and providing sufficient strength in the surface assembly 1.

With reference to FIGS. 3, 4 and 5a to 5d, each discrete element 3 in the surface assembly 1 includes a periphery 6 configured for tessellation with the periphery 6 of at least one other discrete element 3 of the same shape and configuration, so that no spaces are formed between the bodies of adjacent discrete elements 3 in the array 5. This ensures that the discrete elements 3 fit together readily to form the surface assembly 1. The anchor aperture 4 of each discrete element 3 is located inboard of said periphery 6.

The periphery 6 of each discrete element 3 is defined by a polygon in plan view. In some embodiments, said polygon is a regular 3, 4 or 6 sided polygon. In the embodiment of FIGS. 1 to 5d, said polygon is a regular hexagon. In this way, the discrete elements 3 can be manufactured as regular shapes.

The periphery 6 of each discrete element 3 includes a plurality of facets 6a to 6f. Each facet is configured to be arranged against a complementary facet 6a to 6f of at least one other discrete element 3 of the same shape and configuration.

Figure 5A:
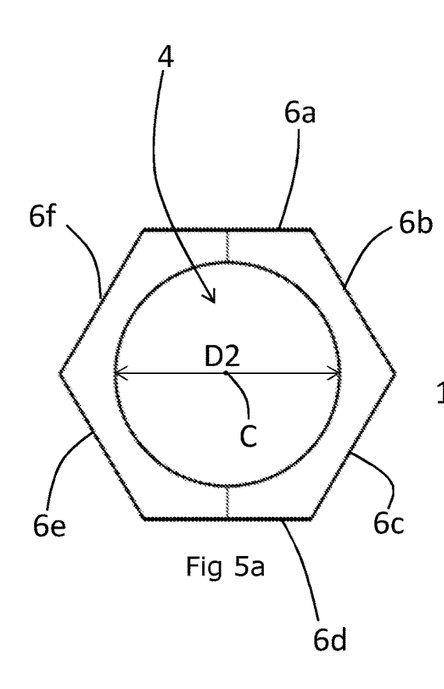
FIGS. 5a to 5d are plan, side and isometric views of a discrete element of the surface assembly depicted in FIGS. 1 and 2.
Figure 5B:
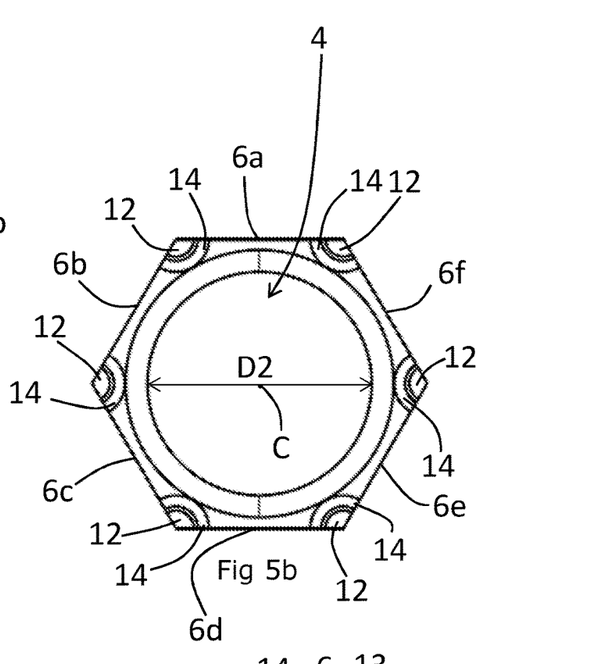
Figure 5C:
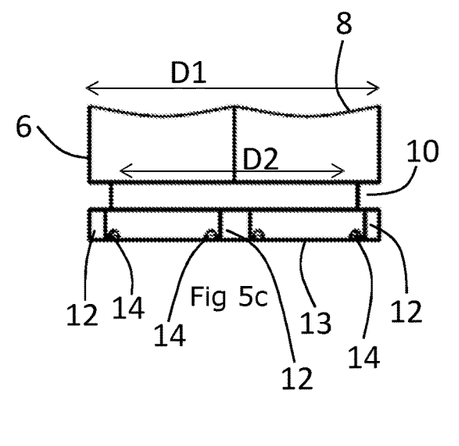
Figure 5D:
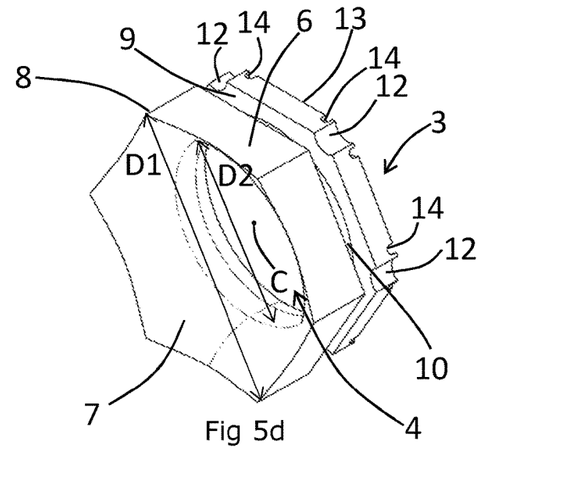
Figure 6A:
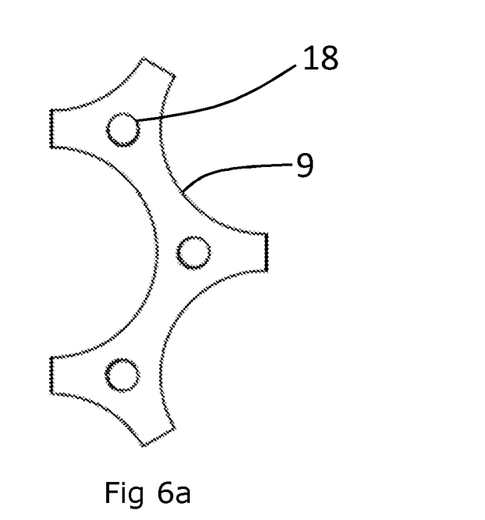
FIGS. 6a to 6d are plan and side views of a link member of the surface assembly depicted in FIGS. 1 and 2.
Figure 6B:
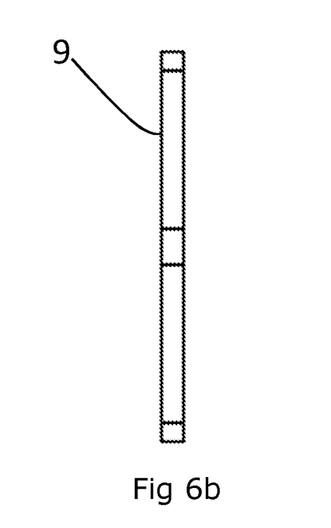
Figure 6C:
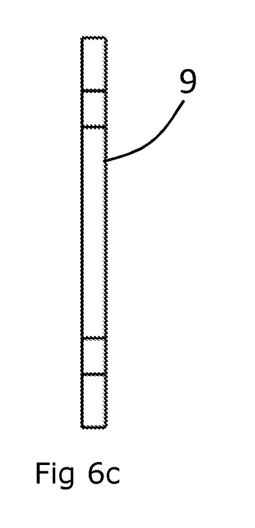
Figure 6D:
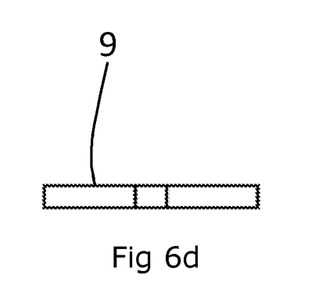

With reference to FIGS. 5c to 5d, each discrete element includes an inner surface 7. Said anchor aperture 4 defines the inner surface 7. A significant proportion of the inner surface 7 has a curved cross section. The curved cross section extends from a first diameter D1 at an upper surface 8 of the discrete element 3 to a second diameter D2 at a depth within the discrete element 3. The first diameter D1 is larger than the second diameter D2. In this way, the curved portion of the inner surface 7 acts like a funnel to guide a hook or like anchor device through the anchor aperture 4.

With reference to FIGS. 3, 4 and 6a to 6d, the surface assembly 1 includes a link member 9 provided to collocate two or more adjacent discrete elements 3 in close proximity.

Each discrete element 3 includes a periphery 6 and a peripheral groove 10 extending around said periphery 6. The peripheral groove 10 is configured for receiving a portion of the link member 9. The link member 9 and the peripheral groove 10 are configured to have complementary size and shape, such that the link member 9 can be disposed between two or more discrete elements 3 of the same size and shape without preventing tessellation of the peripheries 6 above the peripheral grooves 10.

Figure 3:
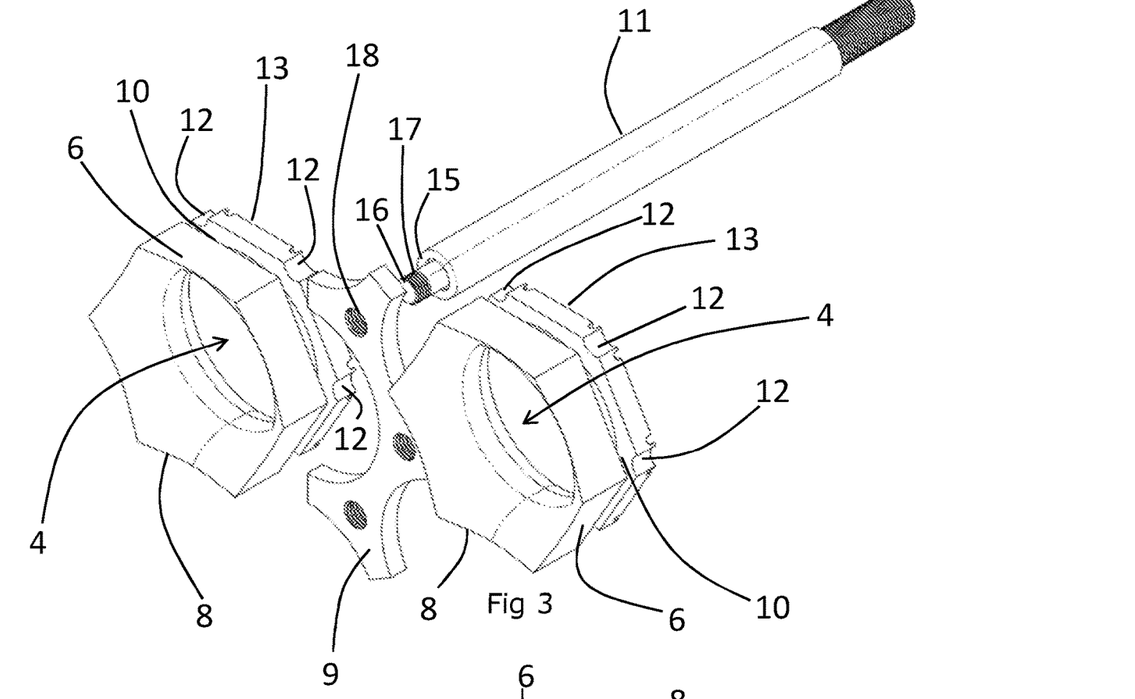
FIGS. 3 and 4 are exploded and assembled isometric views respectively of two discrete elements, one link member and one stanchion of the surface assembly depicted in FIGS. 1 and 2.
Figure 4:
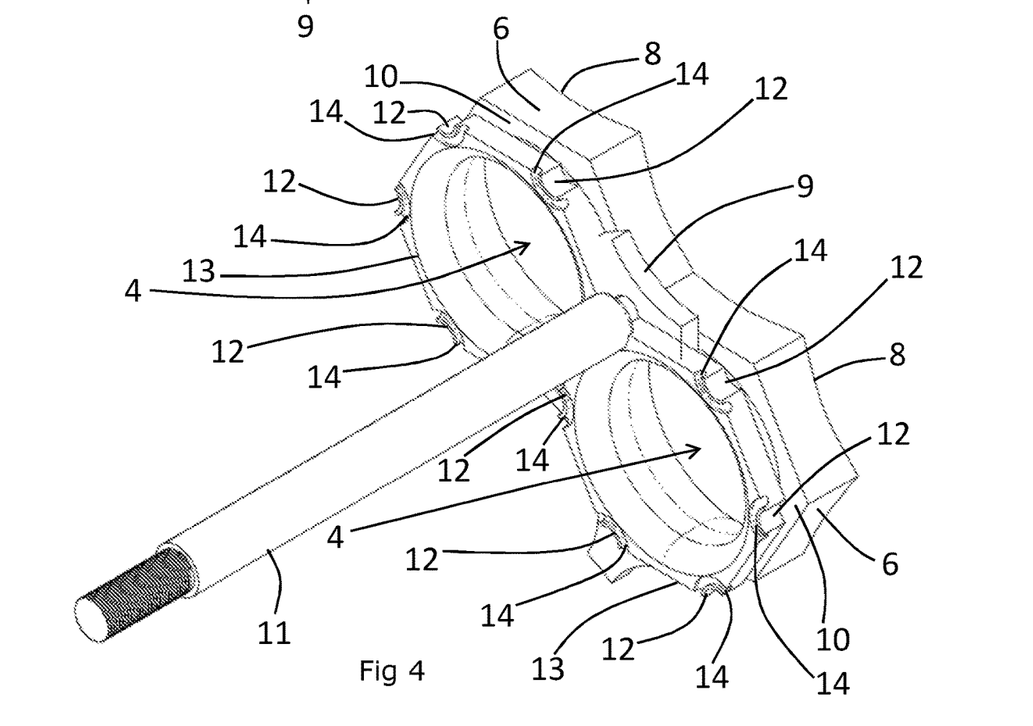

In this way, the link member 9 can be disposed between two adjacent discrete members 3, whilst ensuring no substantial gaps in the upper surface 2 of the surface assembly 1.

With reference to FIGS. 3, 4 and 7a to 7c, the surface assembly 1 includes a locking member 11 provided for locking together the link member 9 and adjacent collocated elements 3 in the array 5.

In this way, the modular components are secured together to create a rigid and fixed surface assembly 1.

Each discrete element 3 includes a lower surface 13 and a distributed plurality of access recesses 12 below the peripheral groove 10. Each access recess 12 is configured for receiving an end of the locking member 11. The access recesses 12 extend from the lower surface 13 to the peripheral groove 10.

In this way, the upper surface 8 of the discrete elements 3 can be tessellated, whilst providing a gap in the lower surface 13 for receiving the locking member 11. This allows the locking member 11 to secure the discrete elements 3 and link member 9 together to form a sturdy and fixed assembly.

Figure 7A:
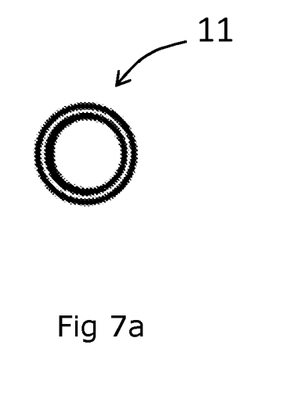
FIGS. 7a to 7c are plan and side views of a locking member of the surface assembly depicted in FIGS. 1 and 2.
Figure 7B:
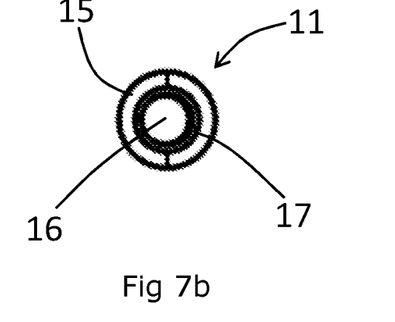
Figure 7C:
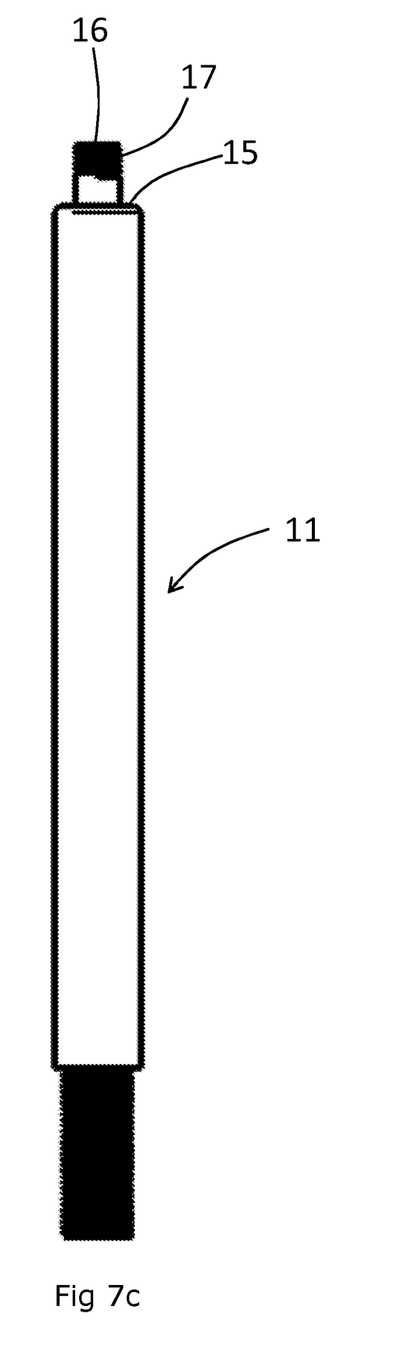

The locking member 11 includes an end 16 and a shoulder 15. The lower surface 13 of the discrete elements 3 includes a portion surrounding said access recesses 12. The end 16 of the locking member 11 extends through said access recesses 12 in the discrete elements 3 to engage the link member 9.

In this way, both the link member 9 and adjacent discrete elements 3 are locked together with a single locking member 11.

The end 16 of the locking member 11 includes a thread 17 and the link member 9 includes a complementary thread within the link member 9. The locking member 11 engages the link member 9 via relative rotation of the threads.

With reference to FIG. 2, the array 5 is spaced from a floor surface 19 in use, via a plurality of stanchions 20.

This provides a void 21 into which a hook or like anchor can extend.

With reference to FIGS. 3, 4 and 7a to 7c, the locking member 11 includes a stanchion 20, for spacing the array 5 from a floor surface 19 in use.

In this way, the stanchion/locking member 11 provides the dual-function of securing the discrete elements 3 and link member 9 together, whilst separating the array 5 from the floor surface 19 to create a void 21 into which a hook or like anchor can extend.

With reference to FIG. 1, the surface assembly 1 defines a landing grid in plan view. The array 5 includes a tessellation of said discrete elements 3.

With reference to FIGS. 5a to 5d, the diameter D2 of each anchor aperture 4 is in the range of 1 cm and 25 cm. In exemplary embodiments, the diameter D2 of each anchor aperture 4 is around 5.1 cm. Each anchor aperture 4 has a centre C. The distance X from the centre C to a centre C of each adjacent anchor aperture 4 is in the range of 1.3 cm and 32.5 cm. In exemplary embodiments, the distance X from the centre C to a centre C of each adjacent anchor aperture 4 is around 6.6 cm.

In this way, the anchor apertures 4 are suitably sized for receiving a hook or like anchor device of known construction and of conforming to landing grid standards.

Each discrete element 3, link member 9 and locking member 11 is of stainless steel. Further, each discrete element 3, link member 9 and locking member 11 is of precipitation hardened stainless steel. Further, each discrete element 3, link member 9 and locking member 11 is of precipitation hardened stainless steel with high tensile strength.

In some embodiments, each discrete element 3, link member 9 and locking member 11 may be of maraging steels.

In alternative embodiments, each discrete element 3, link member 9 and locking member 11 may be of a different metal material.

Such materials ensure that the surface assembly 1 is strong enough for use in securing a helicopter or other powered light aircraft, and for satisfying any relevant standards or safety certification requirements.

Each discrete element 3, link member 9 and locking member 11 is a machined, forged or cast component. This allows an appropriate manufacturing technique to be chosen depending on the type of raw materials used. For example, machining from offcut blocks of metal, casting from molten scrap metal etc.

Each discrete element 3 defines a single anchor aperture 4. This is a simple configuration which is easier to manufacture via a machining, forging or casting process than a multi-aperture component. Moreover, this provides greater flexibility over the size and shape of landing grids that can be assembled.

In the exemplary embodiment depicted in the figures, the locking member 11 includes a shoulder 15 and each discrete element includes a plurality of locking grooves 14 in the lower surface 13. Each locking groove 14 is configured to receive a portion of the shoulder 15 of the locking member 11. The locking grooves 14 extend concentrically around the plurality of access recesses 12.

In this way, the locking grooves 14 provide a better surface for engagement with the complementary shoulder 15 of the locking member 11. In other words, the shoulder 15 of the locking member 11 acts as a key to be located within said locking grooves 14 to fix the locking member 11 to the lower surface 13 of the discrete elements 3.

In other embodiments, the lower surface 13 may comprise a flat face, with no locking grooves 14 around the plurality of access recesses 12.

In the exemplary embodiment depicted in the figures, a shoulder 15 of the locking member 11 is disposed in the locking grooves 14 on the lower surface 13 of the discrete elements 3 surrounding said access recesses 12. In other embodiments, the shoulder 15 of the locking member 11 is configured to abut against a flat lower surface 13 of the discrete elements 3.

With reference to FIGS. 5a to 5d, a discrete element 3 for use in a surface assembly 1 is depicted. The discrete element 3, includes at least one anchor aperture 4 for receiving a hook or like anchor device.

The discrete element 3 also includes a periphery 6, which is configured for tessellation with a periphery 6 of at least one other discrete element 3 of the same shape and configuration.

A peripheral groove 10 extends around the periphery 6. The peripheral groove 10 is configured for receiving a portion of a link member 9.

The discrete element 3 includes a plurality of access recesses 12 below the peripheral groove, for receiving an end 16 of a locking member 11. The access recesses 12 extend from a lower surface 13 of the discrete element 3 to the peripheral groove 10.

Multiple discrete elements 3 of this type can be tessellated to form an array 5. In other words, the discrete elements 3 fit together with no substantial gaps or overlapping between them. Moreover, peripheral grooves 10 and access recesses 12 in the periphery 6 allow link members 9 and locking members 11 of complementary configuration to be used to secure the surface array 5.

A method of constructing a surface assembly 1 includes: providing a plurality of discrete elements 3 as described above; providing a link member 9 of complementary shape and configuration to the peripheral groove 10 in the periphery 6 of each discrete element 3; disposing the link member 9 between adjacent discrete elements 3 to collocate the discrete elements 3; tessellating said plurality of discrete elements 3 to form an array 5; providing a locking member 11, of complementary shape and configuration to the access recesses 12 in the peripheries 6; engaging the locking member 11 with said discrete elements 3 and link member 9 to lock them together. Advantageously, the array may be separated from a floor surface 19 via a plurality of stanchions 20 (which may also function as a locking member 11).

This method provides flexibility to construct landing grids of any size or shape via changing the number or distribution of discrete elements 3, link members 9 and locking members 11. This method of modular construction also allows for simple reconfiguration of the surface assembly 1, replacement of damaged elements and management of obsolescence via upgrading elements. In addition, small modular components can be more easily manufactured, stored and distributed than large surface assemblies.

In exemplary embodiments, the surface assembly defines the whole or a significant proportion of the surface area of a landing zone for a helicopter or other powered light aircraft. In other embodiments, the surface assembly forms part of the periphery or dedicated area within the overall surface area of a landing zone for a helicopter or other powered light aircraft, e.g. so as to define discrete anchor regions within the overall surface area of the landing zone. In such embodiments, the remainder of the landing zone may be constructed from alternative means or materials, e.g. from conventional metal or pavement materials or the like.

The invention claimed is:

1. A helicopter anchoring grid, the anchoring grid having an upper surface defined by a modular structure formed from a plurality of discrete steel elements of the same shape and configuration,
   wherein each discrete steel element has a periphery which is tessellated with the periphery of one or more other discrete steel elements of said plurality of discrete steel elements, wherein no substantial gaps or overlapping regions are formed between the tessellated discrete steel elements in the modular structure,
   wherein each discrete steel element has at least one anchor aperture inboard of the periphery for receiving a hook or anchor device for anchoring a helicopter to the grid;
   wherein the anchoring grid comprises a plurality of steel link members and a plurality of steel stanchions;
   wherein each one of the plurality of steel link members is provided below the upper surface and collocates at least two adjacent discrete steel elements of said plurality of discrete steel elements in tessellation with one another;
   wherein each steel stanchion engages an underside of a respective one of the plurality of steel link members and spaces the respective one of the plurality of steel link members and at least two adjacent discrete steel elements above a ground surface, and wherein each steel stanchion locks the respective one of the plurality of steel link members and at least two adjacent discrete steel elements together.

2. The helicopter anchoring grid according to claim 1, wherein, a sum of the areas defined by the at least one anchor aperture of the plurality of discrete steel elements is in a range of 30% to 70% of a total area of the helicopter anchoring grid in plan view.

3. The helicopter anchoring grid according to claim 1, wherein the periphery of each discrete steel element is defined by a polygon in plan view, wherein said polygon is a regular 3, 4 or 6 sided polygon, or wherein said polygon is a regular hexagon.

4. The helicopter anchoring grid according to claim 1, wherein the periphery of each of the plurality of discrete steel elements comprises a plurality of facets, and wherein each facet is arranged against a complementary facet of at least one other discrete steel element of the plurality of discrete steel elements.

5. The helicopter anchoring grid according to claim 1, wherein each discrete steel element comprises an inner surface defined by the anchor aperture, wherein a significant proportion of the inner surface has a curved cross section, wherein the curved cross section extends from a first diameter at an upper surface of the discrete element to a second diameter at a depth within the discrete element, and wherein the first diameter is larger than the second diameter.

6. The helicopter anchoring grid according to claim 1, wherein the periphery of each of the plurality of discrete steel elements comprises a peripheral groove or recess extending around said periphery, wherein the peripheral groove or recess is configured for receiving a portion of one or more of said plurality of steel link members, wherein each of the plurality of steel link members and the peripheral groove or recess are configured to have complementary size and shape to accommodate one of the plurality of steel link members between two or more of the plurality of discrete steel elements during tessellation of said two or more discrete steel elements, without interfering with the capacity for said two or more discrete steel elements to be capable of tessellation.

7. The helicopter anchoring grid according to claim 6, wherein each of the plurality of discrete steel elements comprises a lower surface and a distributed plurality of access recesses below the peripheral groove or recess, each access recess configured for receiving an end of one of the plurality of steel stanchions, and wherein said access recesses extend from the lower surface to the peripheral groove or recess.

8. The helicopter anchoring grid according to claim 7, wherein each of the plurality of steel stanchions comprises a shoulder and each of the plurality of discrete steel elements comprises a plurality of locking grooves in the lower surface, wherein each locking groove is configured to receive a portion of the shoulder of a respective one of the plurality of steel stanchions, and wherein said locking grooves extend concentrically around the plurality of access recesses.

9. The helicopter anchoring grid according to claim 7, wherein the plurality of steel stanchions comprises an end and a shoulder, wherein the lower surface of each of the plurality of discrete steel elements comprises a portion surrounding said access recesses, wherein the end of each of the plurality of steel stanchions extends through said access recesses in the discrete steel elements to engage a respective one of the plurality of steel link members, wherein the shoulder of each of the plurality of steel stanchions engages the portion of the lower surface surrounding said access recesses, and wherein the end of each of the plurality of steel stanchions comprises a thread and each of the plurality of steel link members comprises a complementary thread within the steel link member, wherein each of the plurality of steel stanchions engages the respective one of the steel link members via relative rotation of the threads.

10. The helicopter anchoring grid according to claim 1, wherein each discrete element defines a single anchor aperture.

11. A landing zone for a helicopter or other powered light aircraft, said landing zone incorporating the helicopter anchoring grid in accordance with claim 1.

12. The landing zone according to claim 11, wherein the helicopter anchoring grid defines a whole or a significant proportion of a surface area of said landing zone.

13. The landing zone according to claim 11, wherein the helicopter anchoring grid forms part of a periphery or one or more dedicated areas within an overall surface area of said landing zone.

14. A method of constructing a helicopter anchoring grid, comprising:
providing a plurality of discrete steel elements of a same shape and configuration, each discrete steel element having a periphery and at least one anchor aperture inboard of the periphery;
and tessellating the periphery of each discrete steel element with the periphery of one or more other discrete steel elements of said plurality of discrete elements to form a modular structure which defines an upper surface in which no substantial gaps or overlapping regions are formed between the tessellated discrete steel elements in the modular structure;
the method including a step of providing a plurality of steel link members, wherein each one of the plurality of steel link members is provided below the upper surface and collocates at least two adjacent discrete steel elements of said plurality of discrete steel elements in tessellation with one another;
the method including a step of providing a plurality of steel stanchions, wherein each steel stanchion engages an underside of a respective one of the plurality of steel link members and spaces the respective one of the plurality of steel link members and at least two adjacent discrete steel elements above a ground surface, and wherein each steel stanchion locks the respective one of the plurality of steel link members and at least two adjacent discrete steel elements together.

15. A helicopter anchoring grid, the anchoring grid having an upper surface defined by a modular structure formed from a plurality of discrete steel elements of the same shape and configuration,
wherein each discrete steel element has a periphery which is tessellated with the periphery of one or more other discrete steel elements of said plurality of discrete steel elements, wherein no substantial gaps or overlapping regions are formed between the tessellated discrete steel elements in the modular structure,
wherein each discrete steel element has at least one anchor aperture inboard of the periphery for receiving a hook or anchor device for anchoring a helicopter to the grid;
wherein the anchoring grid comprises a plurality of steel link members and a plurality of steel stanchions;
wherein each one of the plurality of steel link members is provided below the upper surface and collocates at least two adjacent discrete steel elements of said plurality of discrete steel elements in tessellation with one another;
wherein each steel stanchion engages an underside of a respective one of the plurality of steel link members and spaces the respective one of the plurality of steel link members and at least two adjacent discrete steel elements above a ground surface, and wherein each steel stanchion locks the respective one of the plurality of steel link members and at least two adjacent discrete steel elements together;
wherein each of the plurality of discrete steel elements comprises a body of stainless and/or maraging steel;
wherein the at least one anchor aperture of each discrete steel element comprises a diameter in a range of 2 cm to 10 cm;
wherein a sum of areas defined by the at least one anchor aperture of the plurality of discrete steel elements is in a range of 30% to 70% of a total area of the helicopter anchoring grid in plan view; and wherein each anchor aperture has a centre and wherein a distance from the centre to a centre of each adjacent anchor aperture of the anchoring grid is in a range of 2.6 cm to 13.0 cm.

\* \* \* \* \*